May 2, 1933.  C. KIRCHNER  1,907,323
METHOD AND APPARATUS FOR MAKING SPRING STRUCTURES
Filed June 15, 1931  4 Sheets-Sheet 1
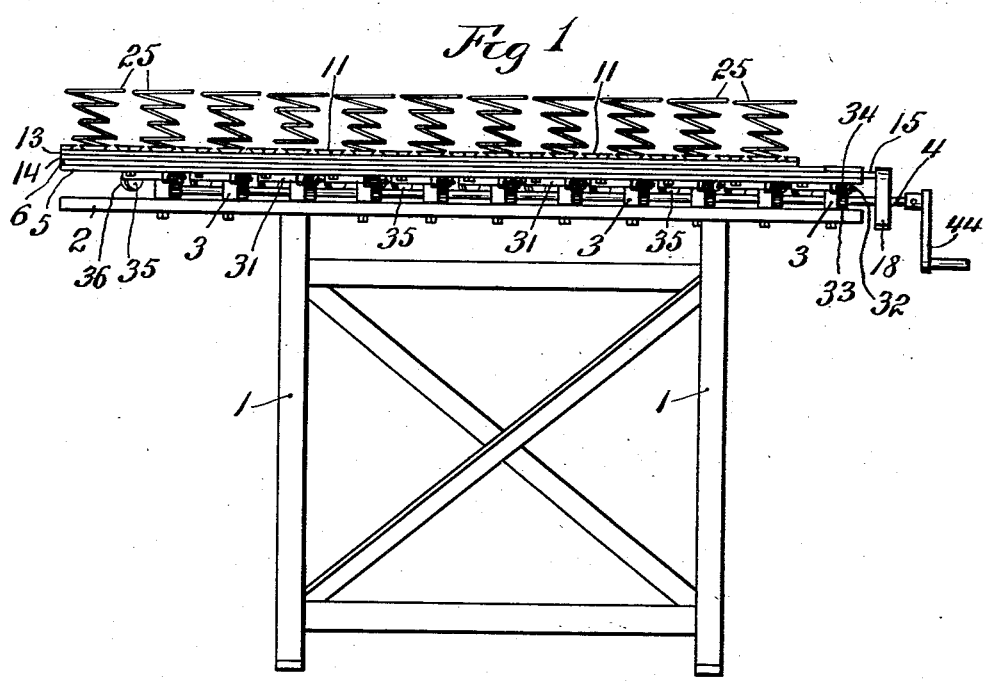
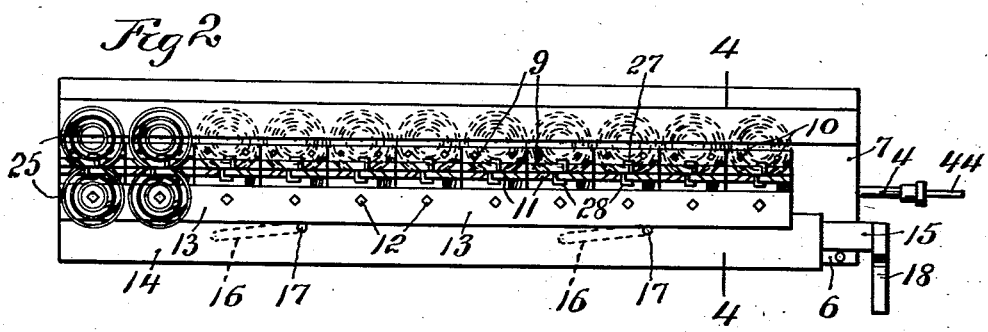
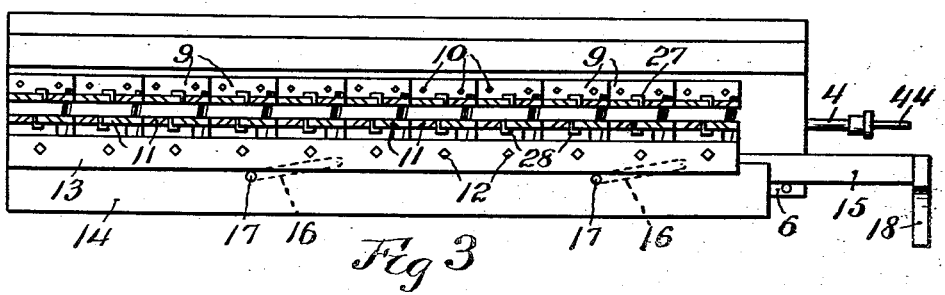
INVENTOR
Carl Kirchner
BY Warren D. House
His ATTORNEY
Witness
H. Vernon Olson

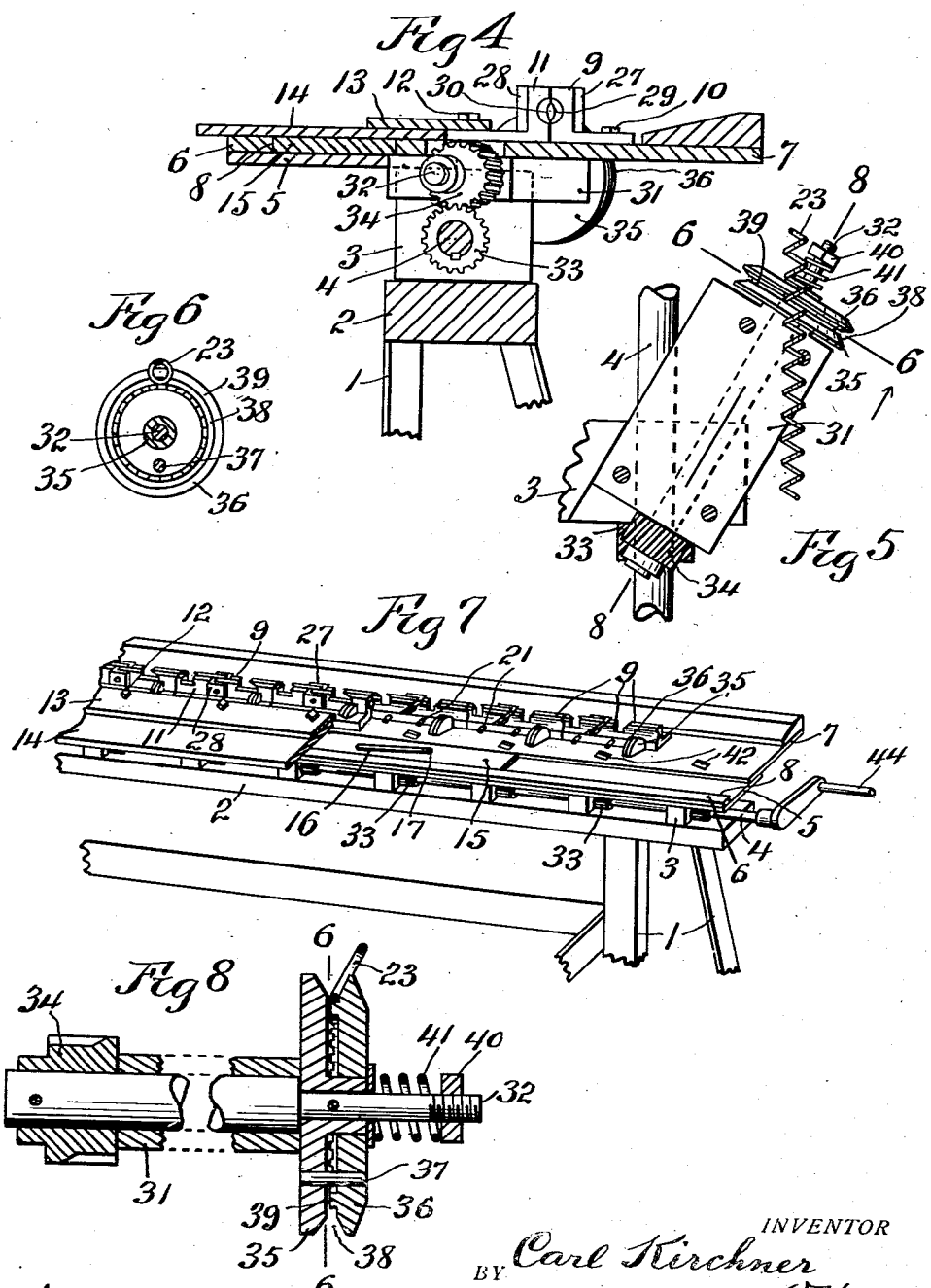

May 2, 1933.  C. KIRCHNER  1,907,323
METHOD AND APPARATUS FOR MAKING SPRING STRUCTURES
Filed June 15, 1931  4 Sheets-Sheet 3
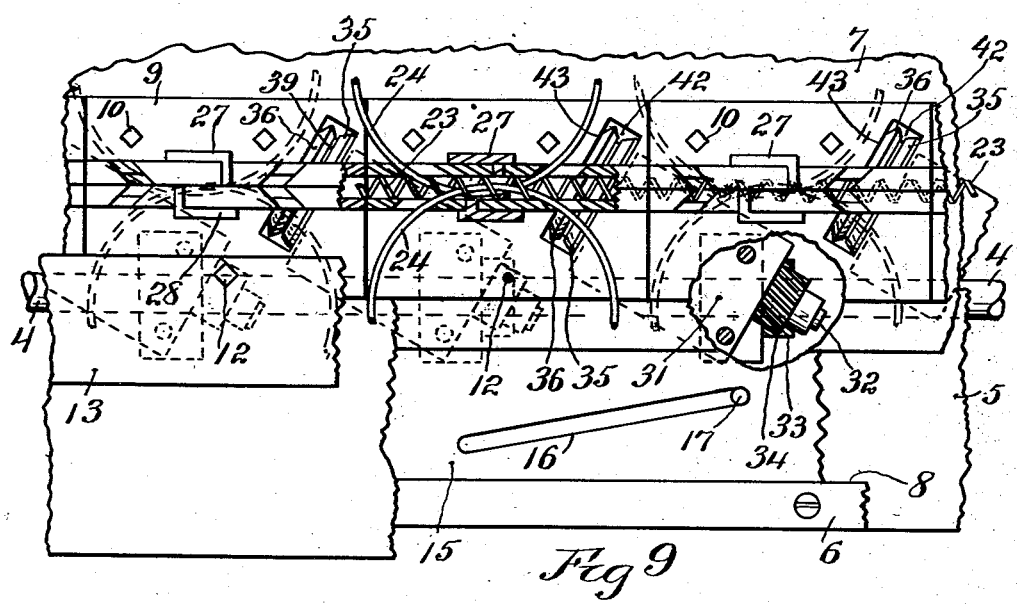
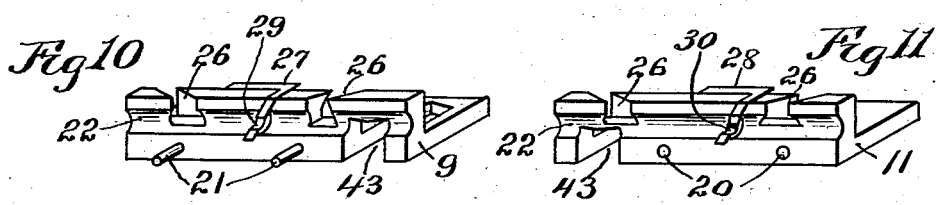
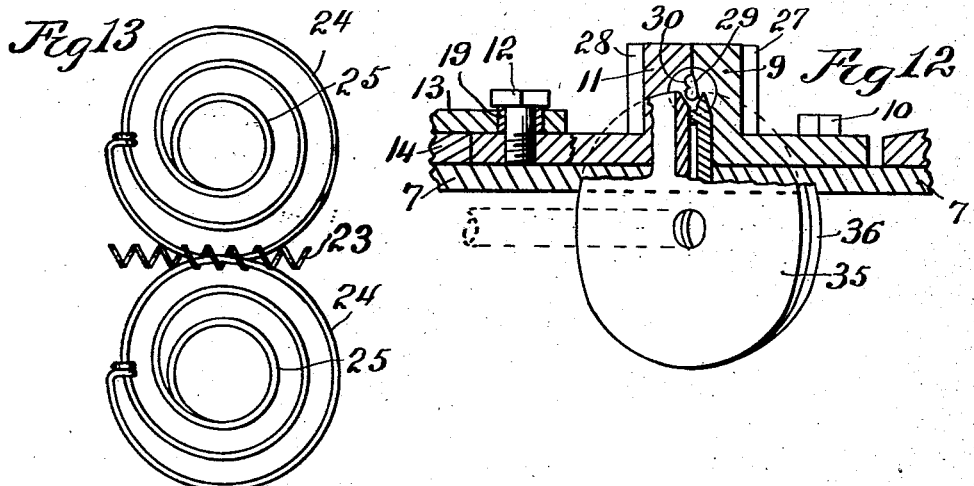
Witness
H. Vernon Olson
INVENTOR
Carl Kirchner
BY Warren D. House
His ATTORNEY

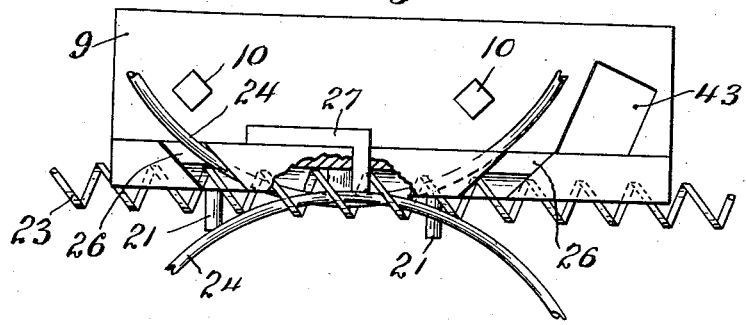
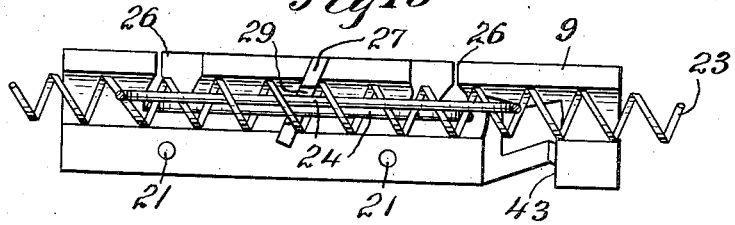
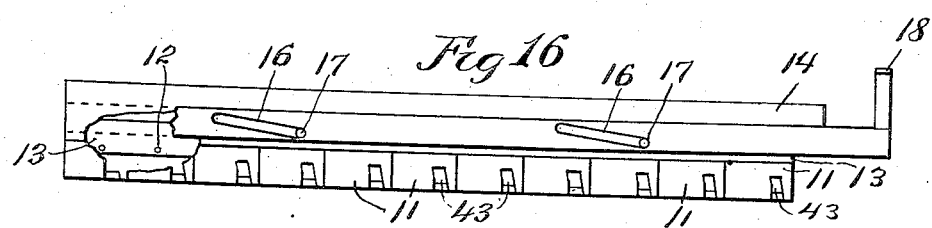
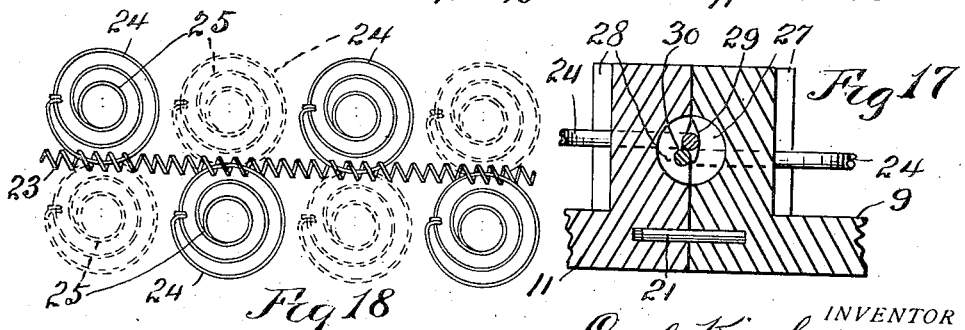

Patented May 2, 1933

1,907,323

UNITED STATES PATENT OFFICE

CARL KIRCHNER, OF CARTHAGE, MISSOURI, ASSIGNOR TO LEGGETT AND PLATT SPRING BED AND MANUFACTURING COMPANY, OF CARTHAGE, MISSOURI, A CORPORATION OF MISSOURI

METHOD AND APPARATUS FOR MAKING SPRING STRUCTURES

Application filed June 15, 1931. Serial No. 544,304.

My invention relates to improvements in methods and apparatus for making spring structures.

It particularly relates to a new method and apparatus for connecting spiral springs by screwing helicals into encircling engagement therewith.

One of the objects of my invention is to provide a novel method and apparatus for rapidly and positively screwing a helical into encircling engagement with wire springs arranged in a row or in parallel rows without liability of the helical becoming bent, jammed or blocked.

Another object of my invention is to provide a novel method and apparatus for connecting two wire springs by encircling with the same coils of a helical parts respectively of said springs.

A further object of my invention is to provide a novel apparatus of the kind described, which is simple, cheap, strong, durable, not likely to get out of order, which will connect with a helical, wire springs arranged in rows of any desired length without the helical becoming bent or blocked, with which the springs to be connected with a helical may be easily and quickly assembled and disassembled and firmly held while being connected, and which is efficient in operation.

Still another object of my invention is the provision of two wire springs adjacent parts of which are encircled by the same coils of a helical.

The novel features of my invention are hereinafter fully described and claimed.

In the accompanying drawings, which illustrate a preferred embodiment of my improved apparatus adapted to carry into effect my improved method, Fig. 1 is a front elevation of my improved apparatus having spiral springs mounted thereon.

Fig. 2 is a top view of the apparatus, spiral springs being shown mounted thereon, some in solid lines and some in dotted lines, parts of the apparatus being shown in horizontal section, the spring clamping jaws being shown closed.

Fig. 3 is a top view of the apparatus, the jaws being shown open and in horizontal section.

Fig. 4 is an enlarged section on the line 4—4 of Fig. 2, the spring clamping jaws being shown closed.

Fig. 5 is an enlarged top view of one of the helical feeding devices and parts connected therewith.

Fig. 6 is a reduced cross section on the line 6—6 of Fig. 8.

Fig. 7 is a perspective view, partly broken away of a part of the apparatus, the spring clamping jaws being shown closed.

Fig. 8 is an enlarged section, partly broken away on the line 8—8 of Fig. 5.

Fig. 9 is an enlarged top view, partly broken away of a part of the apparatus, the jaws being shown closed and holding spiral springs, parts only of which are shown.

Fig. 10 is a perspective view of one of the spring clamping members of one of the jaws which form the guiding means for the helical.

Fig. 11 is a perspective view of one of the spring clamping members of the other jaw, which member cooperates with the jaw member shown in Fig. 10.

Fig. 12 is a fragmental cross section, partly broken away, through two of the clamping jaw members in the closed position, two of the helical feeding members, partly broken away being shown in perspective.

Fig. 13 is an end view of two of the spiral springs with one set of end coils connected by a helical with the same coils of the latter.

Fig. 14 is an enlarged top view of one of the spring clamping jaw members, partly broken away, parts of two spiral springs and a helical being shown engaged therewith.

Fig. 15 is a front elevation of what is shown in Fig. 14.

Fig. 16 is a bottom view, partly broken away, of the movable jaw and the slotted slide bar which moves it to and from the closed position.

Fig. 17 is an enlarged cross section through two of the clamping jaw members, shown in the closed position and holding clamped two spiral springs, parts only of which are shown, parts of the jaw members being broken away.

Fig. 18 is a plan view of two rows of spiral springs connected by a helical, some of the springs being shown in solid lines and some in dotted lines.

Similar reference characters designate similar parts in the different views.

My improved method of connecting wire springs arranged in a row, or in two parallel rows, with a helical, provides for the screwing of the helical into encircling engagement with parts of the springs at one set of ends thereof, by a force applied at one or at a plurality of points between the ends of the row or rows. Such screwing force is preferably such that at the points at which it is applied to the helical, it will axially turn and forwardly push and pull the helical.

When a helical is guided and screwed into encircling engagement with wire springs it sometimes meets with sufficient frictional resistance to bend the helical or block its forward feeding. This often occurs when the screwing force is applied, as is commonly done, from back of the rear end of the row.

By applying the helical screwing force, as is done in my improved method, at a point, or, preferably, at a plurality of points along the row or rows of springs, liability of bending the helical or of its becoming blocked in the screwing operation is eliminated.

Helicals have been screwed into engagement with spiral springs by imparting axial rotation thereto, dependence being placed upon the engagement of the rotating helical with a fixed object to obtain the forward screwing movement needed. Such engagement with the fixed object produced frictional resistance to the forward feeding of the helical, which would cause it to bend or become blocked. With my improved method, the screwing force applied to the helical effects the axial turning and also both pushes and pulls the helical forwardly, thereby preventing bending of the helical or causing it to become blocked by its friction against the means which guides it or against the springs which it encircles.

My improved method provides further the overlapping of parts of two coils of two springs, one part upon the other, and the encircling of these overlapping parts with a plurality of the same helical. By overlapping the coils, instead of having them abut edge to edge, a larger number of coils of the helical can be made to encircle arcuate parts of coils, than when such arcuate parts abut against each other. The springs will thus be more firmly connected with each other, than where they are encircled by fewer coils of the helical.

The spiral springs of two parallel rows may be arranged with the springs of one row respectively opposite to the springs of the other row, as shown in Fig. 13, or they may be arranged in alternate order, as represented by the springs shown in solid lines in Fig. 18. When arranged in pairs, as in Fig. 13, and as shown in solid and dotted lines in Fig. 18, the helical will have the same coils encircle springs of each pair.

In the drawings is shown my improved apparatus for carrying into effect my improved method.

The apparatus has a supporting frame comprising legs 1 on which is mounted a horizontal longitudinal member 2 supporting blocks 3, which serve as bearings for a horizontal longitudinal rotary shaft 4, Figs. 1, 4 and 7.

On the blocks 3 is mounted a longitudinal horizontal plate 5 to the upper side of which are fastened two plates 6 and 7, parallel to the plate 5, and having their adjacent edges spaced apart to form with the bottom plate 5 a longitudinal guiding groove 8.

The plates 5, 6 and 7 form a portion of a fixed jaw, the remaining portion of which comprises a longitudinal row of fixed spring holding jaw members 9 fastened by bolts 10 to the upper side of the plate 7, one of said jaw members 9 being shown in Figs. 10, 14 and 15 detached from the others.

The fixed jaw members 9 cooperate with movable spring holding jaw members 11, arranged in a longitudinal row parallel with the row of jaw members 9 and respectively opposite the latter.

The movable jaw members 11 are loosely fastened by bolts 12 to the under side and rear portion of a longitudinal plate 13 fastened to the upper side and projecting beyond the rear edge of another longitudinal plate 14, which is forwardly and rearwardly slidable on the plates 6 and 7, Figs. 2, 3, 7, 9 and 12.

The plate 14 together with the plate 13 and jaw members 11 are moved to and from the closed position, Figs. 2, 7 and 9, in which the jaw members 11 abut respectively against the jaw members 9, by a longitudinal plate 15 slidably mounted in the groove 8 and which has two oblique slots 16 in which are respectively slidably fitted two guide pins 17 fastened to and projecting downwardly from the plate 14, Figs. 2, 3, 7, 9 and 16.

The slide plate 15 at one end has a handle 18 by which it is moved to and from a jaw closing position.

The plates 14 and 13 and the jaw members 11 form the movable jaw of the apparatus.

When the slide plate 15 is moved to the left, as viewed in Figs. 2, 7 and 9, the pins 17 will force the movable jaw to the closed spring holding position.

When the slide plate 15 is moved to the right, as viewed in Fig. 3, the movable jaw will be retracted by the pins 17 to the open spring releasing position.

Each bolt 12 extends through a sleeve 19, Fig. 12, which is mounted in a hole in the plate 13, and which is slightly longer than the thickness of the plate 13, the upper end of the sleeve 19 bearing against the head of the adjacent bolt 12, and its lower end bearing against the adjacent jaw member 11. The jaw members 11 rest slidably on the plate 7, and are respectively provided in their rear edges with holes 20 in which are respectively slidably mounted forwardly projecting pins 21 mounted in the front edges of the fixed jaw members 9, Figs. 7, 10, 11, 14, 15 and 17.

The front side of each fixed jaw member 9, and the rear side of each movable jaw member 11 is provided with a longitudinal helical guiding groove 22, Figs. 10, 11, 15 and 17, which is semicircular in cross section. The grooves 22 are so disposed as to form a longitudinal straight channel, circular in cross section, when the jaws are closed. Through this channel a helical, 23, Figs. 9, 14 and 15, is guided into encircling engagement with the bottom coils 24 of wire springs, which may be spiral springs 25, shown in Figs. 1, 2, 9, 13, 14, 15 and 18, that are held clamped between the jaw members 9 and 11.

Each jaw member 9 and 11 is provided in its upper side with two slots 26 which intersect the guiding groove 22, and through which slots 26 is inserted the bottom coil 24 of a spring 25.

For firmly holding the parts of the bottom coils 24 of the spiral springs 25 which are disposed in the guiding channel 22, each fixed jaw member 9 has extending into said channel an inclined holding plate 27, which diverges upwardly from and cooperates with an oppositely inclined holding plate 28 in the opposite movable jaw member 11. The adjacent edges of the holding plates 27 and 28 are respectively provided with registering notches 29 and 30 though which extend the adjacent portions of the bottom coils 24, Figs. 9, 10, 12, 14, 15 and 16.

In order to clamp the coils 24 between the jaw members 9 and 11 in position for having screwed into encircling engagement with the coils of a helical 23, the slide plate 15 is pulled, by its handle 18, to the position shown in Fig. 3, thus through the pins 17 forcing the movable jaw to the open position, as has been described.

Spiral springs 25 then have their bottom coils slipped through the slots 26 of the fixed jaw members 9 into the adjacent grooves 22, following which other springs 25 have their bottom coils 24 inserted through the slots 26 of the movable jaw members 11, the slots 26 in the jaw members 11 being of such depth that the coils of the springs disposed in the jaw members 11 will be just above the plane of the coils 24 in the fixed jaw members.

The slide plate 15 is then pushed inwardly to the left to the closed position, shown in Figs. 2 and 9, thus forcing the movable jaw to the closed position, the jaw members 11 carrying the adjacent springs 25 to a position in which the bottom coils thereof will be disposed upon the adjacent parts of the rear row of springs 25, as shown in Figs. 9, 13 and 14. The inclined holding plates 27 and 28 will now firmly hold the bottom coils 24 of the two rows of spiral springs.

For screwing a helical 23 into encircling engagement with the parts of the coils 24 thus held in the guiding grooves 22, the following described mechanism is provided.

Mounted respectively on the upper sides of the blocks 3 and fastened to the under side of the plate 7 are obliquely disposed horizontal blocks 31 having respectively rotatably mounted in them horizontal shafts 32 disposed obliquely to the rotary shaft 4 and rotated thereby by means of pinions 33 fastened to the shaft 4 and rotatable therewith, and which respectively mesh with pinions 34 respectively fastened to and rotatable with the shafts 32, Figs. 4, 5, 8 and 9.

Respectively fastened to and rotatably with the shafts 32 are circular helical gripping members 35. Respectively slidable on the hubs of the member 35 are circular gripping members 36, each of which is held from rotation relatively to the adjacent gripping member 35 by a pin 37 fixed in the member 36 and slidable in a hole in the adjacent member 35, Fig. 8.

The peripheries of the members comprising disks 35 and 36 are bevelled so as to form between the members an annular groove 38 with outwardly diverging walls, said groove being adapted to receive a helical 23, the wire of which is adapted to rest on the outer side of an annular peripheral flange 39 which forms the bottom of the annular channel or groove 38. The adjacent end of the shaft 32 is threaded and has mounted thereon a nut 40, Figs. 5 and 8, against which bears one end of a coil spring 41, which encircles the shaft 32 and has its other end bearing against the slidable member 36, and normally forcing the latter toward the member 35, whereby the helical 23 is held between the members 35 and 36 and has continuous gripping and traveling engagement therewith throughout each revolution, when said members 35 and 36 are rotated.

The plate 7 has slots 42 through which upwardly respectively extend the upper portions of the helical gripping members 35 and 36. The fixed and movable jaw members 9 and 11 are provided with slots 43 which register with each other and with the slots 42. The upper portions of the rotary gripping members 35 and 36 extend upwardly through the slots 43 into the helical guiding grooves, and are so disposed therein that a helical 23 guided in the helical guiding grooves will enter the groove 38 and will be gripped, turned axially, and pushed and pulled through the guiding channel between the jaws 9 and 11, and will be thus screwed into encircling engagement with the parts of the coils 24 which overlap each other in the guiding channel.

For rotating the shaft 4 so as to screw the helical into engagement with the spiral springs 25, the shaft at the end of the apparatus at which is located the handle 18, is provided with a crank 44.

The disposition of the gripping members 35 and 36 in the guiding channel 22 is such that they will engage the helical at the bottom side thereof, as shown in Figs. 5 and 8. The oblique disposition of the shafts 32, as shown, is such that the gripping member 35 and 36 are adapted to engage and forwardly screw a helical with a right hand lead, as shown.

Upon turning the shaft 4 clockwise, as viewed from the end of the shaft having the crank 44, the shafts 32 will be rotated in the opposite direction and will turn the helical 23, by means of the members 35 and 36, so as to feed the helical forwardly consecutively past each pair of holding plates 27 and 28, and consecutively into encircling engagement with each pair of coils 24, when the springs are oppositely disposed, or alternately with the springs of opposite rows, when the springs are alternately disposed, as shown in dotted lines in Fig. 18.

The jaw members 9 and 11 and the inclined guiding and holding plates 27 and 28 mounted therein are so disposed that they will position and hold the coils 24 of the springs 25, so as to insure the proper number of coils of a helical 23 encircling each coil 24.

It will be noted that the lead or inclination of the plates 27 and 28, of those portions which are in the grooves 22 is substantially the same as the lead of the helical to be engaged therewith, and that the pairs of plates 27 and 28 and gripping members 35 and 36 are so spaced that a helical will be fed forwardly from each pair of rotary gripping members 35 and 36 to the next forward pair of plates 27 and 28, and from these plates to the next forward gripping members 35 and 36, without the helical being crowded or buckled. This construction enables the use of helicals of very small wire, much smaller than can be employed where the helicals are driven from their free ends only.

The use of helicals of such relatively small wire effects a considerable reduction in the cost of the material used.

When the coils 24 are oppositely disposed in pairs, as shown in Fig. 13, the coils of each pair will be encircled by the same coils of the helical 23, and will be firmly held thereby. By having one coil 24 disposed upon the other, and the overlapping portions arcuate, a larger number of coils of a helical will encircle such portions than would be the case if the said portions were disposed edge to edge. This arrangement eliminates straightening the portions of the coils to be encircled to enable the portions being encircled by a maximum number of helical coils. By having the coils 24 to be engaged and held together by the helical disposed one on the other in unlocked relation to each other, the springs may be easily and quickly assembled in position for being fastened together.

By disposing the rotary obliquely disposed helical feeding and gripping members 35 and 36 between different springs in the rows, the feeding force is applied so as to pull and push as well as axially rotate the helical.

With this disposition of the gripping members 35 and 36, in connection with the inclined guiding plates 27 and 28, helicals not only of small wire, but those which have been bent or distorted may be screwed into encircling engagement with the coils 24 without becoming blocked.

While the helicals commonly used are of spring wire, with my improved apparatus helicals of relatively soft wire, if desired, may be employed.

Various forms of wire springs, other than spiral springs, may be connected by helicals with my improved apparatus providing that the parts thereof to be so connected are adapted for engagement between the jaws 9 and 11 in the grooves 22.

As shown in Figs. 6 and 8, the side of the annular flange 39 on the rotary gripping member 36, which is next the member 35, has radial grooves, which permit dirt and small slivers or cuttings to fall from between the gripping members. The flange 39 is such peripheral width as to require the helical in entering between the members 35 and 36 to rock the member 36 but little, so that it may have a fairly close fit on the hub of the member 35.

In causing the helical to enter between the first pair of gripping members 35 and 36, the helical is given a twist in the proper direction, with the gripping members turning. After being engaged with the first pair of members 35 and 36, the helical easily enters into operative engagement with the other pairs of gripping members 35 and 36 and with the coils 24 of the springs 25.

After the first two rows of springs have been fastened together by a helical, the slide plate 15 is pulled out to open the holding jaws 9 and 11, and a forward turn is given the shaft 4 to release the helical from the feeding gripping members 35 and 36. The two connected rows are then removed from between the jaws 9 and 11 by being lifted therefrom.

The rear sides of the springs of the second row are then advanced and engaged with the jaws 9, and another, or third row of springs are engaged with the jaws 11 and a helical is then engaged with the springs of the second and third rows. In this manner all the springs to form the bed are connected together, after which a border helical is screwed into engagement with the advance and rear edges respectively of the front and last rows.

The partly completed bed is then turned over and the free ends of the springs are fastened in the same manner as were the opposite ends thereof. Two tables, not shown, may be placed at the front and rear of the apparatus respectively for supporting the springs during the operation of fastening them together with the helicals.

I do not limit my invention to the precise steps specified nor to the specific structure shown and described, as many modifications, within the scope of the appended claims, may be made without departing from the spirit of my invention.

What I claim is:—

1. In the making of spring structures, the method of connecting wire springs arranged in a row, consisting in screwing a helical into encircling engagement with parts of said springs respectively, by a force applied to the helical between two of said springs.

2. In the making of spring structures, the method of connecting wire springs arranged in a row, consisting in screwing a helical into encircling engagement with parts of said springs respectively, by a force applied to the helical at the front and rear of one of said springs.

3. In the making of spring structures, the method of connecting wire springs arranged in two parallel rows, consisting in screwing a helical into encircling engagement with a part of each of said springs, by a force applied to the helical between two of the springs in one of said rows.

4. In the making of spring structures, the method of connecting wire springs arranged in two parallel rows, consisting in screwing a helical into encircling engagement with a part of each of said springs, by a force applied to the helical at the front and rear of one of said springs.

5. In the making of spring structures, the method of connecting wire springs arranged in a row, consisting in screwing a helical into encircling engagement with parts of said springs respectively, by a force applied to the helical between two of said springs and which axially turns and forwardly pushes and pulls the helical.

6. In the making of spring structures, the method of connecting wire springs arranged in a row, consisting in screwing a helical into encircling engagement with parts respectively of said springs, by a force applied to the helical at the front and rear of one of said springs and which axially turns and forwardly pushes and pulls the helical.

7. In the making of spring structures, the method of connecting wire springs arranged in two parallel rows, consisting in screwing a helical into encircling engagement with a part of each of said springs, by a force appled to the helical between two of the springs in one of said rows and which axially turns and forwardly pushes and pulls the helical.

8. In the making of spring structures, the method of connecting wire springs arranged in two parallel rows, consisting in screwing a helical into encircling engagement with a part of each of said springs, by a force applied to the helical at the front and rear of one of said springs and which axially turns and forwardly pushes and pulls the helical.

9. In the making of spring structures, the method of connecting two wire springs each having a coil, consisting in disposing the springs with a portion of one coil disposed against and in unlocked relation to a portion of the other coil and screwing and pulling and pushing a helical into encircling engagement with said portions and with both of said portions encircled by the same coils of the helical.

10. In an apparatus for making spring structures, a support having means for guiding a helical and for holding wire springs with parts respectively thereof in the path of said helical, and means for engaging said helical between two of said springs and imparting to said helical and axial turning and advancing movement, whereby said helical will consecutively encircle said parts.

11. In an apparatus for making spring structures, a support having means for guiding a helical and for holding two parallel rows of wire springs with parts respectively thereof in the path of said helical, and means for engaging said helical between two springs of one of said rows and imparting an axial turning and advancing movement whereby said helical will encircle said parts.

12. In an apparatus for making spring structures, a support having means for guiding a helical and having means adapted for holding two end coils respectively of two spiral springs with parts respectively of said coils adjacent to each other in the path of said helical, and means located in advance of said coils for engaging and screwing said helical while in said guiding means into encircling engagement with said parts with the latter encircled by the same coils of said helical.

13. In an apparatus for making spring structures, a support having guiding means for a helical and having means adapted for holding two end coils respectively of two spiral springs with parts of said coils respectively disposed one over the other, and means located in advance of said coils for engaging and screwing said helical while in said guiding means into encircling engagement with said parts with the latter encircled by the same coils of said helical.

14. In an apparatus for making spring structures, guiding means for a helical, a rotary device disposed in said guiding means and having its axis oblique to the path of said helical, and means cooperating therewith for forwardly screwing and pulling and pushing said helical in said guiding means.

15. In an apparatus for making spring structures, a support having two jaws, one movable toward and from the other, adapted to hold between them a wire spring and, when closed, forming guiding means for a helical, a part of said spring, when so held, being in the path of said helical, and means in said guiding means for engaging and forwardly screwing and pulling and pushing said helical in said guiding means and into encircling engagement with said part.

16. In an apparatus for making spring structures, a support having two jaws movable one toward and from the other and adapted to hold between them two parallel rows of wire springs, and, when closed, forming guiding means for a helical, parts respectively of said springs, when so held, being in the path of said helical, and means in said guiding means for engaging and forwardly screwing and pulling and pushing said helical in said guiding means into encircling engagement with said parts.

17. In an apparatus for making spring structures, a support having two jaws movable one toward and from the other and adapted to hold between them a row of wire springs, and, when closed, forming guiding means for a helical, parts respectively of said springs, when so held, being in the part of said helical, and means between two of said springs so held for engaging and forwardly screwing said helical in said guiding means into encircling engagement with said parts.

18. In an apparatus for making spring structures, a helical feeding device comprising two rotary members comprising two disks one movable toward and from the other, said members having the same axis and having circular peripheral means for holding between them and to have, throughout each revolution continuous traveling engagement with the wire of a helical, means for guiding said wire into engagement with said members, and yielding means normally forcing said movable member to the clamping position.

19. In an apparatus for making spring structures, guiding means for a helical, and a helical feeding device comprising two rotary members comprising two disks one movable toward and from the other, said members being in said guiding means having the same axis oblique to the path of said helical in said guiding means, said members being disposed in said path and having circular peripheral means for holding between them and to have, throughout each revolution, continuous traveling engagement with the wire of said helical, means for holding said members from turning relatively to each other, and yielding means normally forcing said movable member to the clamping position.

In testimony whereof I affix my signature.

CARL KIRCHNER.